United States Patent [19]
Zelikovitz

[11] 3,814,472
[45] June 4, 1974

[54] AIR DEFLECTOR FOR VEHICLE

[76] Inventor: Joseph Zelikovitz, 214 Island Park Dr., Ottawa, Ontario, Canada Kly-4j6

[22] Filed: June 25, 1973

[21] Appl. No.: 373,390

[30] Foreign Application Priority Data
July 4, 1972 Great Britain .................. 31282/72

[52] U.S. Cl. ............................................. 296/1 S
[51] Int. Cl. ............................................. B60j 1/04
[58] Field of Search ....... 296/1 S, 1 R, 95; 280/403; 105/2

[56] References Cited
UNITED STATES PATENTS
2,863,695   12/1958   Stamm ............................... 296/1 S Primary Examiner—Stanley H. Tollberg

[57] ABSTRACT

An air deflector for a vehicle, comprising an inflatable contoured bag having as a defined perimeter a separately inflatable bead, with air valves opening into the bag and into the bead. A frame attachable to a vehicle comprises a channel with a restricted slot whereby the deflated bead is receivable into the channel and retained in the channel when inflated.

10 Claims, 4 Drawing Figures

AIR DEFLECTOR FOR VEHICLE

This invention relates to an air deflector for a vehicle.

All vehicles when in motion are impeded by air resistance. Trucks, house and mobile trailers and busses when travelling at high speeds are subject to a large amount of air resistance because of the flat or blunt surface they present to the wind stream.

Manufacturers produce this shape of vehicle so they can maintain maximum cubic inch space within the vehicles and still remain within the maximum length allowed by law. This gain in increased cubic inch space is offset by the cost of more powerful engines, by higher fuel consumption to maintain given speeds, and by increased engine emission pollution.

It is an object of the present invention to provide an inflatable, light-weight air deflector for mounting on the front portion of a motor vehicle or trailer.

An example embodiment of the invention is shown in the accompanying drawings in which.

Figure 1:
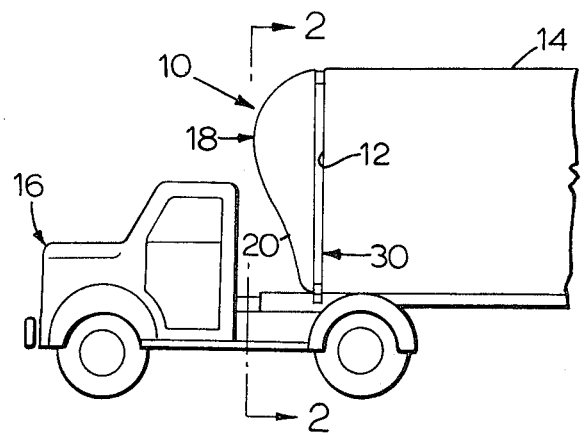
FIG. 1 is a side view of the forward portion of a trailer truck having an air deflector mounted on the front of the trailer.

The example embodiment shown in the drawings consists of an air deflector 10 which is mounted on the front end wall 12 of a trailer 14 hitched to a transport truck 16 as seen in FIG. 1. Air deflector 10 comprises a flexible inflatable bag 18 which is shaped to have a rearward portion 19 lie against, and substantially cover, the area of end wall 12 while a forward portion 20 projects outwardly from the end wall when the bag is inflated. The two portions 19 and 20 of bag 18 are joined together by a seal 22 adjacent the perimeter of the bag to form a tubular bead 24 which is separately inflatable. A valve 26, of known type for inflation, opens into bag 18 and a similar valve 28 opens into bead 24.

A frame 30 is fixed to the periphery of the front end wall 12 of trailer 14 by suitable means such as screws 32. Frame 30 comprises a strip of rigid material which is generally U-shaped in transverse cross-section to form a base 34 and a pair of upstanding flanges 36 and 38. Lip 40 of flange 36 curves inwardly to form, with base 34 and flange 38, a cavity or pocket 42 having an elongated opening or slot 44 running the length of the frame.

Figure 2:
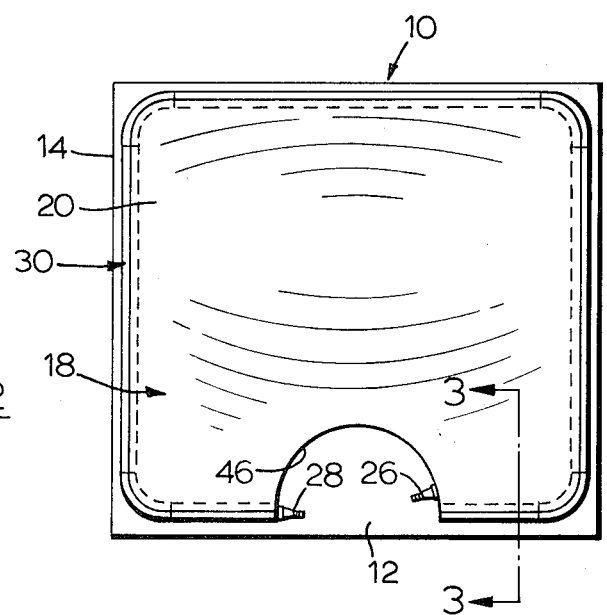
FIG. 2 is a view taken along line 2—2 of FIG. 1.
Figure 3:
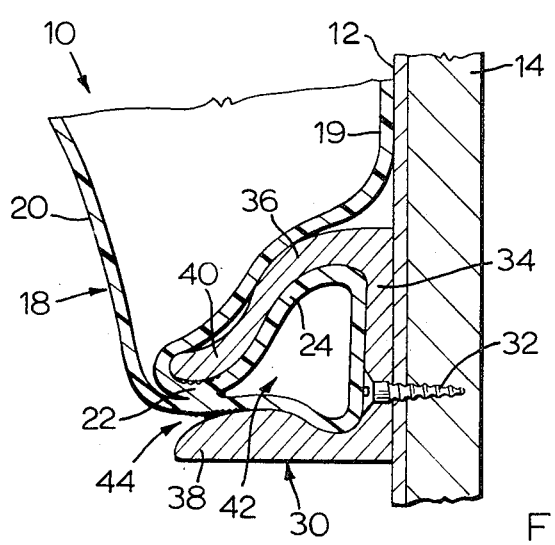
FIG. 3 is a view in cross-section taken along line 3—3 of FIG. 2.

In the illustrated embodiment a portion 46 of the periphery of bag 18 is recessed as shown in FIG. 2 to accommodate elements projecting from front end wall 12 of trailer 14 and valves 26 and 28 are located in this recessed portion.

In the operation of the example embodiment the desired surface contour of front portion 20 of air deflector 10 is determined and air bag 18 is constructed accordingly, for example in substantially hemispherical or conical shape. Frame 30 is fixed along the perimeter of front end wall 12 of trailer 14 by screws 32 and bead 24 is inserted into cavity 42 through slot 44 of the frame. Bead 24 is then inflated through valve 28, for instance by an air hose used for inflating automobile tires. When inflated, bead 24 fills cavity 42 in frame 30 to hold bag 18 on the frame. Bag 18 is then inflated through valve 26 to form air deflector 10 with rearward portion 19 of the air bag lying against front end wall 12 and forward portion 20 of the air bag assuming a shape predetermined by the construction of the bag. When not in use, bag 18 and bead 24 may be deflated and removed from trailer 14. Bead 24 may be deflated and removed if bag 18 is broken.

The material used for the construction of bag 18 is preferably 10 to 20 guage vinyl and frame 30 is preferably made of extruded aluminum. It will be appreciated that bag 18 may be shaped to expose specific areas of the surface to which it is attached, such as the headlights on the front end of a bus, or to bridge projections of the surface to be streamlined, such as a refrigeration unit on the front end of a truck trailer or a ridge along the top of a house trailer.

Figure 4:
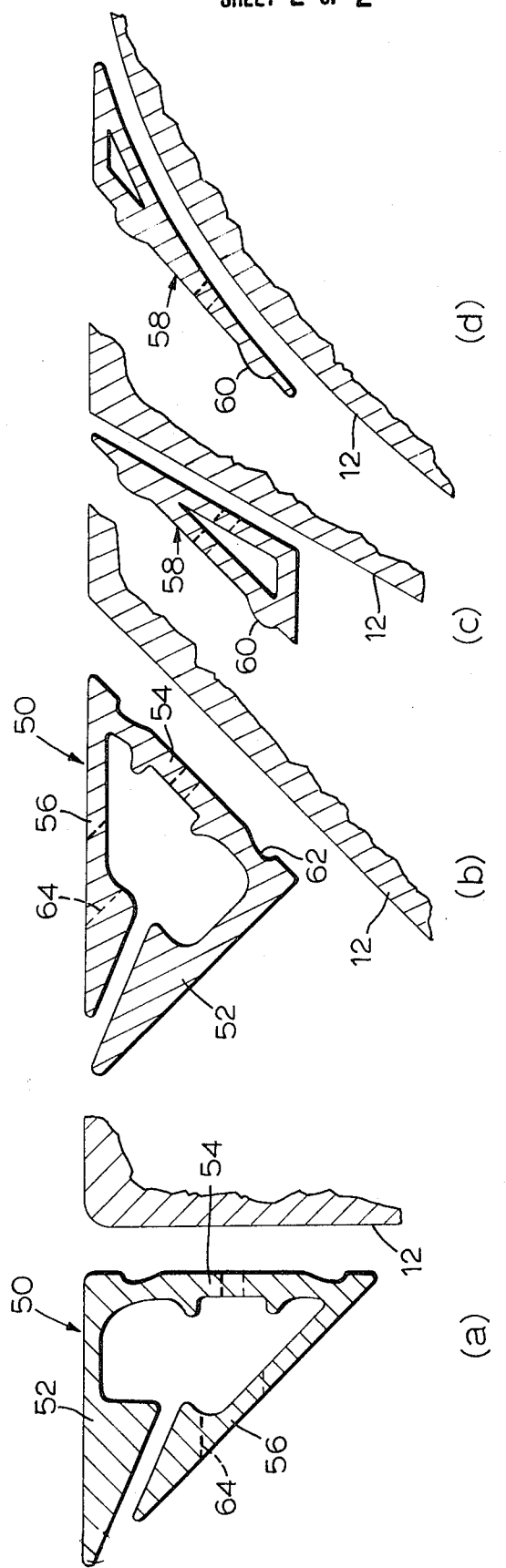
FIG. 4 is a transverse cross-sectional view of an alternate embodiment of a frame.

In the embodiment shown in FIG. 4 a frame 50 is shaped to be reversible for mounting on front end walls 12 of differing shapes. By making one flange 52 perpendicular to base 54 of frame 50 and the other flange 56 at 45 degrees to base 54, the frame is reversible as shown in FIGS. 4(a) and 4(b). By using an auxiliary wedge 58 of any particular shape, as seen in FIGS. 4(c) and 4(d), frame 50 is further adaptable to be mounted on a front end wall 12 of a slope other than 45 degrees and even a curved end wall. Dimples 60 on wedge 58 cooperate with depressions 62 in base 54 of frame 50 to locate the frame on the wedge. It will be noted also that mounting screws 34 may be inserted in base 54 through a plurality of circular apertures 64 spaced along flange 56, and this means of mounting may also be used with frame 30.

I claim:

1. An air deflector for a vehicle, comprising: a flexible, inflatable bag having an air valve opening into the bag, and an inflatable tubular bead circumscribing the bag and fixed thereto with a further air valve opening into the bead, the bag having a predetermined shape when inflated and the bead forming a predetermined perimeter about the bag.

2. An air deflector as claimed in claim 1 including a frame attachable to the vehicle, the frame being constructed and arranged to retain the bead of the bag when the bead is inflated.

3. An air deflector as claimed in claim 1 in which the walls of the bag and the bead are coextensive, a continuous portion of the opposing walls of the bag being sealed together to form the bead.

4. An air deflector as claimed in claim 1 in which material forming the bag is vinyl.

5. An air deflector as claimed in claim 2 in which the frame comprises at least one channel having a base and an upstanding pair of flanges, the flanges of the channel converging to form a cavity having a slotted opening whereby the bead when deflated is receivable in the cavity and held in the cavity when inflated.

6. An air deflector as claimed in claim 5 in which the base of the channel has a plurality of apertures for receiving fastening means for attachment of the frame to a vehicle.

7. An air deflector as claimed in claim 6 including an aperture, in at least one of the flanges, opposing each of the apertures in the base of the channel.

8. An air deflector as claimed in claim 2 in which the base of the channel is flat, one of the flanges of the channel projects from the base at right angles thereto towards said one flange.

9. An air deflector as claimed in claim 2 including a spacer having one surface contoured to be registrable with the base of the channel and another surface contoured to be registrable with a given surface of the vehicle.

10. An air deflector as claimed in claim 1 in which the bag has at least one recess inwardly from the perimeter thereof, the continuity of the bead being interrupted at the recess.

* * * * *